US006954042B2

(12) United States Patent
Lee et al.

(10) Patent No.: US 6,954,042 B2
(45) Date of Patent: Oct. 11, 2005

(54) THREE-PHASE BLDC MOTOR SYSTEM AND CIRCUIT AND METHOD FOR DRIVING THREE-PHASE BLDC MOTOR

(75) Inventors: Joung-Joo Lee, Changwon (KR); Ssi-Chol Choi, Bucheon (KR)

(73) Assignee: Fairchild Korea Semiconductor Ltd.., Kyungki-do (KR)

( * ) Notice: Subject to any disclaimer, the term of this patent is extended or adjusted under 35 U.S.C. 154(b) by 0 days.

(21) Appl. No.: 10/884,750

(22) Filed: Jul. 2, 2004

(65) Prior Publication Data

US 2005/0001570 A1 Jan. 6, 2005

(30) Foreign Application Priority Data

Jul. 4, 2003 (KR) ................................ 10-2003-0045194

(51) Int. Cl.[7] .................................................. H02P 5/06
(52) U.S. Cl. ........................ 318/254; 318/138; 318/439
(58) Field of Search ................................ 318/254, 138, 318/439

(56) References Cited

U.S. PATENT DOCUMENTS 4,242,608 A * 12/1980 Ishigaki et al. ........... 310/68 R
4,283,664 A * 8/1981 Ebert ......................... 318/138
4,373,148 A * 2/1983 Gutz .......................... 318/254
4,511,828 A * 4/1985 Wada ......................... 318/254
4,739,264 A * 4/1988 Kamiya et al. ............. 324/251
5,162,709 A * 11/1992 Ohi ............................ 318/254
5,969,489 A * 10/1999 Itou et al. ................... 318/254
6,020,700 A * 2/2000 Tien ........................... 318/254
6,069,428 A * 5/2000 Nelson ........................ 310/90
6,307,337 B1 * 10/2001 Nelson ....................... 318/254
6,359,406 B1 * 3/2002 Chiu et al. .................. 318/439
6,552,453 B2 * 4/2003 Ohiwa et al. ............. 310/68 B

* cited by examiner

*Primary Examiner*—Rita Leykin
(74) *Attorney, Agent, or Firm*—Sidley Austin Brown & Wood LLP

(57) ABSTRACT

A motor driving circuit is described for three-phase brushless DC motors, which have a three-phase-coil and first and second Hall sensors to detect the magnetic field of a rotor. The motor driving circuit includes first and second comparators, comparing a first and second pair of Hall signals from the Hall sensors, and outputting a first and second Hall signals. An adder unit receives the first and second pair of Hall signals to output a third pair of Hall signals to a third comparator, which outputs a third Hall signal. A motor driver is controlled by the first, second, and third Hall signals of the first, second and third comparators to change directions of currents flowing through phases of the three-phase coil accordingly to rotate the rotor of the motor. The first and second Hall signals can be amplified to match the level of the third Hall signal, or vice versa.

18 Claims, 9 Drawing Sheets

THREE-PHASE BLDC MOTOR SYSTEM AND CIRCUIT AND METHOD FOR DRIVING THREE-PHASE BLDC MOTOR

CROSS REFERENCE TO RELATED APPLICATION

This application claims priority to and the benefit of Korea Patent Application No. 2003-45194 filed on Jul. 4, 2003 in the Korean Intellectual Property Office, the content of which is incorporated herein by reference in its entirety.

BACKGROUND

1. Field of the Invention

The present invention relates to a three-phase brushless direct current (BLDC) motor system, and a circuit and method for driving a three-phase BLDC motor. More specifically, the present invention relates to a three-phase BLDC motor system, and a circuit and method for driving a three-phase BLDC motor using two Hall sensors.

2. Description of the Related Art

A general 3-phase brushless direct current (BLDC) motor includes a 3-phase (U-phase, V-phase, and W-phase) coil installed at a stator and a permanent magnet attached to a rotor.

A BLDC motor driving circuit provides current to the three phases of the coil installed at the stator of the 3-phase BLDC motor. The rotor of the motor is rotated according to a magnetic field generated by the current provided by the driving circuit. The rotor is continuously rotated in one direction by the sequential on and off switching of switching elements according to the position of the rotor. The switching elements detect the position of the rotor by detecting its magnetic field and change the direction of the current flowing through each phase of the stator coil based on the position of the rotor.

The position of the rotor is sensed by three Hall detectors, which sense the magnetic field of the rotor. These Hall sensors generate three signals, which have a phase difference of 120° between them. Hall detectors can be Hall sensors or Integrated Circuits (ICs).

FIG. 1 shows a conventional BLDC motor and a driving circuit. Conventional BLDC motor 10 includes a 3-phase (U phase, V phase, and W phase) coil 13 installed at a stator, a rotor 12 with a permanent magnet attached to it, and three Hall sensors 11*a*, 11*b*, and 11*c* that detect the intensity of a magnetic field of the rotor.

Hall sensor 11*a* senses the magnetic field of the rotor at its location and outputs two signals $Hu^+$ and $Hu^-$ with a magnitude corresponding to the sensed magnetic field, which have a phase difference of 180°. Hall sensor 11*b* senses the magnetic field of the rotor at its location and outputs two signals $Hv^+$ and $Hv^-$ with a magnitude corresponding to the sensed magnetic field, which have a phase difference of 180°. Hall sensor 11*c* senses the magnetic field of the rotor at its location and outputs two signals $Hw^+$ and $Hw^-$ with a magnitude corresponding to the sensed magnetic field, which have a phase difference of 180°.

FIG. 2 illustrates the waveforms of the signals $Hu^+$, $Hu^-$, $Hv^+$, $Hv^-$, $Hw^+$, and $Hw^-$.

Referring to FIG. 1 again, motor driving circuit 40 receives the signals output from Hall sensors 11*a–c* and provides currents to 3-phase coil 13 to control the rotation of rotor 12. Motor driving circuit 40 has comparators 42*a*, 42*b*, and 42*c*. Comparator 42*a* receives the two signals $Hu^+$ and $Hu^-$ output from Hall sensor 11*a* and outputs a Hall signal Hu. Comparator 42*b* receives the two signals $Hv^+$ and $Hv^-$ output from Hall sensor 11*b* and outputs a Hall signal Hv. Comparator 42*c* receives the two signals $Hw^+$ and $Hw^-$ output from Hall sensor 11*c* and outputs a Hall signal Hw. Hall signals Hu, Hv, and Hw are used for controlling a motor driver 44.

Motor driver 44 changes the direction of the currents flowing through the phases of the coil in response to the Hall signals, output from comparators 42*a*, 42*b*, and 41*c*.

Conventional BLDC motor 10 and motor driving circuit 40 require three Hall sensors 11*a*, 11*b*, and 11*c* installed at the motor and six input terminals provided at the motor driving circuit 40, driving up the cost of the motor.

SUMMARY

Briefly and generally, according to aspects of the present invention, the number of Hall sensors of BLDC motors is reduced, resulting in lower costs and simpler circuitry.

According to aspects of the invention, a motor driving circuit is described for three-phase brushless DC motors, which have a three-phase-coil and first and second Hall sensors to detect the magnetic field of a rotor. The motor driving circuit includes a first comparator, coupled to the first Hall sensor to receive and compare a first pair of Hall signals generated by the first Hall sensor, and configured to output a first Hall signal; and a second comparator, coupled to the second Hall sensor to receive and compare a second pair of Hall signals generated by the second Hall sensor, and configured to output a second Hall signal. Further, the motor driving circuit includes an adder unit, coupled to the first and second Hall sensors to receive the first pair of Hall signals from the first Hall sensor and a second pair of Hall signals from the second Hall sensor to output a third pair of Hall signals; a third comparator, coupled to the adder unit to compare the third pair of Hall signals of the adder unit and to output a third Hall signal; and a motor driver, coupled to the first, second and third comparators to receive the first, second, and third Hall signals in order to change directions of currents flowing through phases of the three-phase coil accordingly.

According to aspects of the invention a method is described for driving a three-phase brushless DC motor having a three-phase-coil and first and second Hall sensors for detecting the magnetic field of a rotor. The method includes comparing a first pair of Hall signals, outputted by the first Hall sensor, to output a first Hall signal; comparing a second pair of Hall signals, outputted by the second Hall sensor, to output a second Hall signals; receiving the first pair of Hall signals and the second pair of Hall signals to generate a third pair of Hall signals; comparing the third pair of Hall signals to output a third Hall signal; and changing directions of currents flowing through phases of the three-phase coil according to the first, second, and third Hall signals to rotate the rotor of the motor.

BRIEF DESCRIPTION OF THE DRAWINGS

The accompanying drawings illustrate embodiments of the invention, and, together with the description, serve to explain the principles of the invention.

DETAILED DESCRIPTION

According to embodiments of the invention, a BLDC motor and a motor driving circuit are presented, which employ two Hall sensors and include a simple circuit between the Hall sensors and the comparators of the motor driving circuit to generate a Hall signal.

Figure 3:
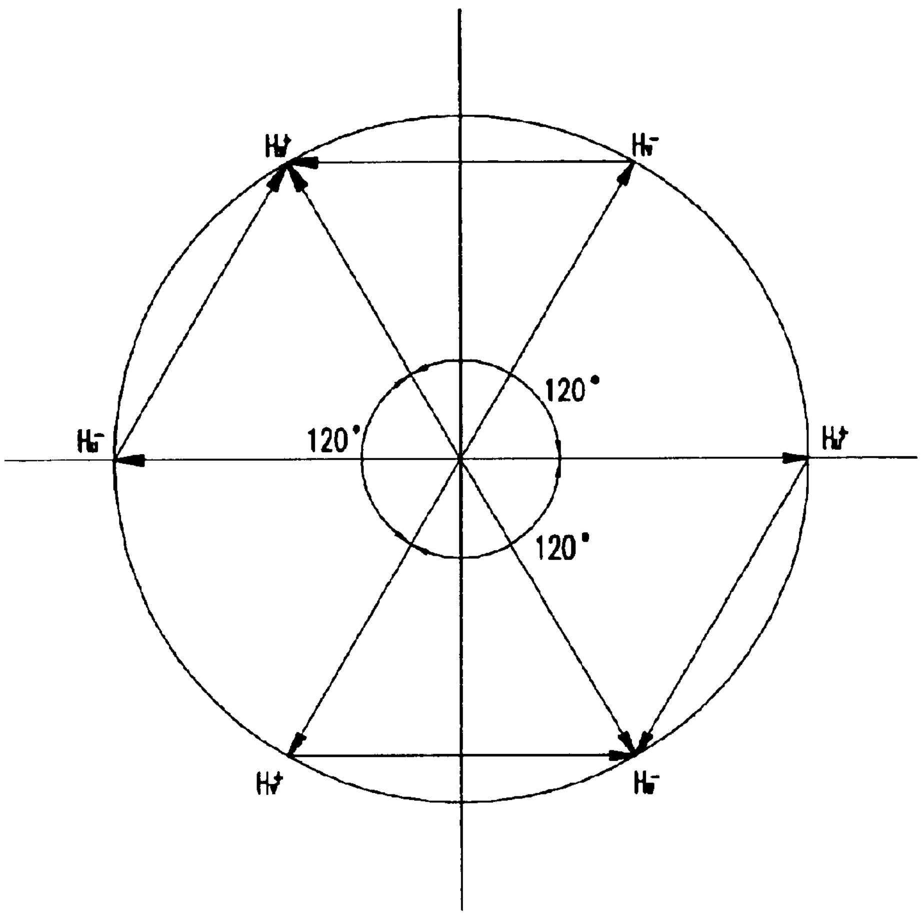
FIG. 3 shows vectors of Hall signals of a three-phase BLDC motor.

FIG. 3 illustrates a principle of the BLDC motor driving circuit according to embodiments of the present invention. As explained above, the Hall sensors of the conventional BLDC motor output six signals. The six signals can be represented in a vector form as shown in FIG. 3. There is a pair-wise phase difference of 120° between signals $Hu^+$ and $Hv^+$, signals $Hv^+$ and $Hw^+$, and signals $Hv^+$ and $Hw^+$, respectively. Further, there is a pair-wise phase difference of 180° between signals $Hu^+$ and $Hu^-$, signals $Hv^+$ and $Hv^-$, and signals $Hw^+$ and $Hw^-$.

Accordingly, one Hall sensor can be omitted when the six signals are appropriately combined. For example, Hall signal $Hw^+$ can be generated as the vector sum of Hall signals $Hu^-$ and $Hv^-$. Further, Hall signal $Hw^-$ can be generated as the vector sum of Hall signals $Hu^+$ and $Hv^+$. Based on these observations, embodiments of the invention generate Hall signal Hw by combining Hall signals Hu and Hv as follows:

$$Hw^+=(Hu^-)+(Hv^-)$$

$$Hw^-=(Hu^+)+(Hv^+) \tag{1}$$

Therefore, the Hall sensor for detecting signal Hw can be omitted and embodiments of the present invention can control BLDC motors using only two Hall sensors.

In systems, where the time dependence of Hall signal $Hu^+$ takes the form VMcoswt, the other Hall signals can be represented as follows (where VM stands for the absolute value of the maximum voltage of the Hall sensor output):

$$Hu^+=VM\cos wt$$

$$Hv^+=VM\cos(wt-120°)$$

$$Hw^+=VM\cos(wt+120°)$$

$$Hu^-=VM\cos(wt+180°)$$

$$Hv^-=VM\cos(wt+60°)$$

$$Hw^-=VM\cos(wt-60°) \tag{2}$$

When Equation (1) is combined with Equation (2), the following Equation (3) is obtained for $Hw^-$:

$$\begin{aligned} Hw^- &= (Hu^+)+(Hv^+) \\ &= VM\{\cos wt+\cos(wt-120°)\} \\ &= VM\{\cos((wt-60°)+60°)+\cos((wt-60°)-60°)\} \\ &= VM\{2\cos(60°)\cos(wt-60°)\} \\ &= VM\cos(wt-60°) \end{aligned} \tag{3}$$

Figure 4:
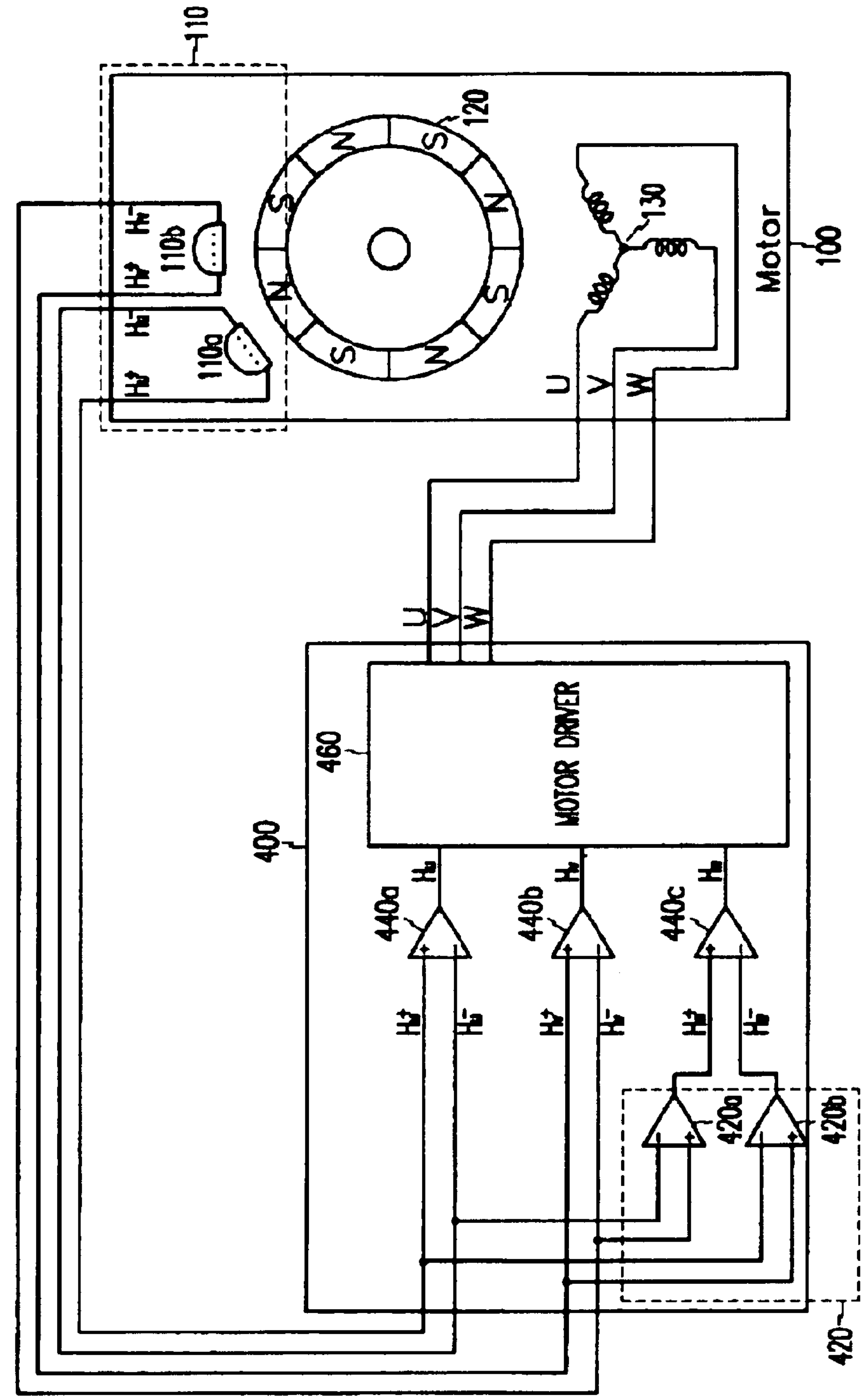
FIG. 4 shows a three-phase BLDC motor and a driving circuit according to an embodiment of the present invention.

FIG. 4 shows a BLDC motor 100 and a motor driving circuit 400 according to an embodiment of the present invention. BLDC motor 100 and motor driving circuit 400 constitute a BLDC motor system. BLDC motor 100 includes a 3-phase (U phase, V phase, and W phase) coil 130 installed at a stator, a rotor 120 with a permanent magnet 120 attached to it, and two Hall sensors **110*a* and 110*b* that can detect the magnetic field of rotor 120**.

Hall sensor **110*a* senses the magnetic field of rotor 120 at its location and outputs two signals $Hu^+$ and $Hu^-$ with a magnitude corresponding to the sensed magnetic field, which have a phase difference of 180°. Hall sensor 110*b* senses the magnetic field of rotor 120** at its location and outputs two signals $Hv^+$ and $Hv^-$ with a magnitude corresponding to the sensed magnetic field, which have a phase difference of 180°.

Motor driving circuit 400 includes an adder unit 420, comparators **440*a*, 440*b*, and 440*c*, and a motor driver 460. Adder unit 420 uses Hall signals $Hu^+$, $Hu^-$, $Hv^+$, and $Hv^-$ to generate Hall signals $Hw^+$ and $Hw^-$. Adder unit 420 includes a first adder 420*a* that adds Hall signals $Hu^-$ and $Hv^-$ to generate Hall signal $Hw^-$, and a second adder 420*b*** that adds Hall signals $Hu^+$ and $Hv^+$ to generate Hall signal $Hw^+$.

Comparator **440*a* receives Hall signals $Hu^+$ and $Hu^-$ from Hall sensor 110*a* and outputs Hall signal Hu. Comparator 440*b* receives Hall signals $Hv^+$ and $Hv^-$ from Hall sensor 110*b* and outputs Hall signal Hv. Comparator 440*c* receives output signal $Hw^+$ of first adder 420*a* and output signal $Hw^-$ of second adder 420*b* and outputs a Hall signal Hw. Hall signals Hu, Hv, and Hw control motor driver 460**.

Motor driver 460 changes the direction of currents flowing through the three phases of coil 130 according to Hall signals Hu, Hv, and Hw, to continuously rotate rotor 120 in one direction.

Figure 5:
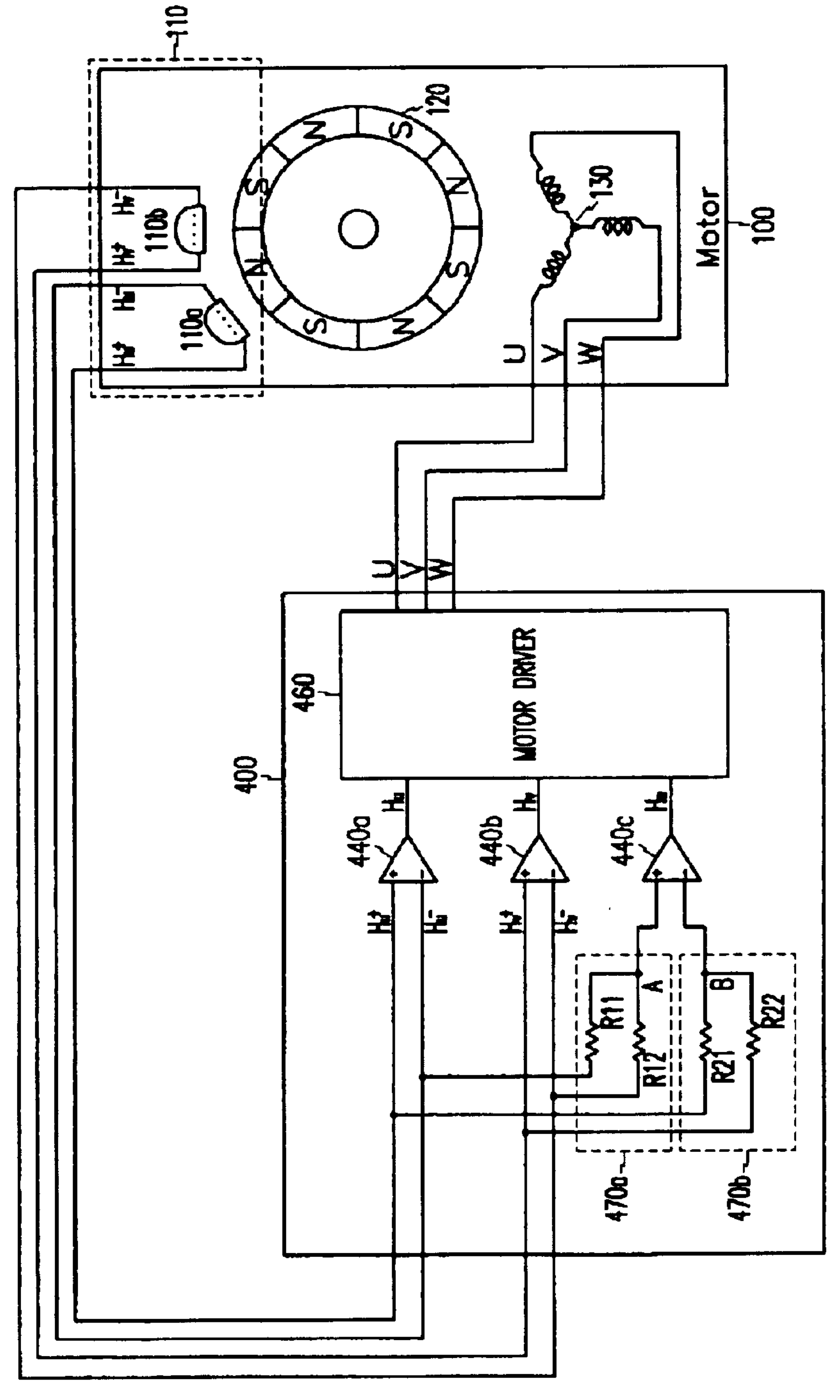
FIG. 5 shows a three-phase BLDC motor and a driving circuit according to an embodiment of the present invention.

FIG. 5 shows BLDC motor 100 and motor driving circuit 400 according to an embodiment of the present invention. Like reference numerals in FIGS. 4 and 5 denote like elements, and thus their description will be omitted.

As shown in FIG. 5, motor driving circuit 400 includes first and second adders **470*a* and 470*b*. First adder 470*a* includes resistors R11 and R12. One of the terminals of resistor R11 is configured to receive Hall signal $Hu^-$. One of the terminals of resistor R12 is configured to receive Hall signal $Hv^-$. The other terminals of resistors R11 and R12 are coupled to each other. Second adder 470*b* includes resistors R21 and R22. One terminal of resistor R21 is configured to receive Hall signal $Hu^+$. One of the terminals of resistor R22 is configured to receive Hall signal $Hv^+$. The other terminals of resistors R21 and R22 are coupled to each other. In some embodiments resistors R11 and R12 have essentially the same resistance value R1, and resistors R21 and R22 have essentially the same resistance value R2**.

Figure 6:
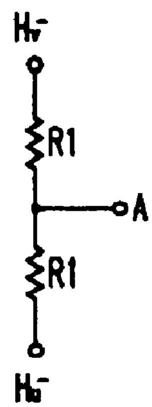
FIG. 6 is an equivalent circuit diagram of an adder according to an embodiment of the present invention.

FIG. 6 illustrates an equivalent circuit for first adder **470*a*. The illustrated circuit is indeed an equivalent circuit, because the output node A of first adder 470*a* is coupled to an input of comparator 440*c***, which has high impedance. Thus, the voltage of output node A is represented as follows:

$$Hw^+=(Hu^-+Hv^-)/2 \tag{4}$$

Similarly, the voltage of the output node B of second adder 470*b* is represented as follows:

$$Hw^{-}=(Hu^{+}+Hv^{+})/2 \quad (5)$$

According to Eqs. (4)–(5), Hall signal $Hw^{+}$ is generated by first adder 470*a* and Hall signal $Hw^{-}$ is generated by second adder 470*b*.

Figure 7:
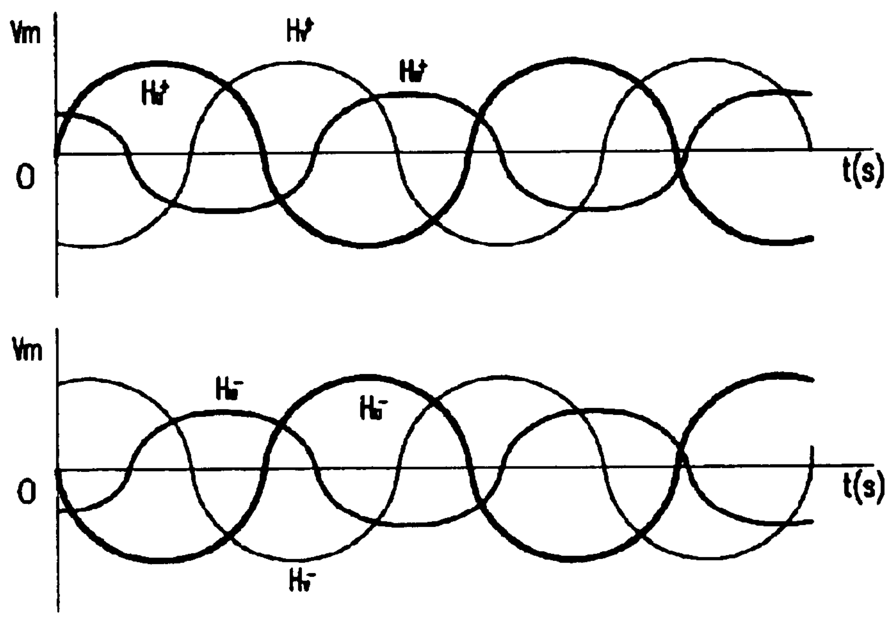
FIG. 7 shows waveforms of Hall signals according to an embodiment of the present invention.

FIG. 7 shows waveforms of the output signals of adders 470*a* and 470*b*.

Figure 1:
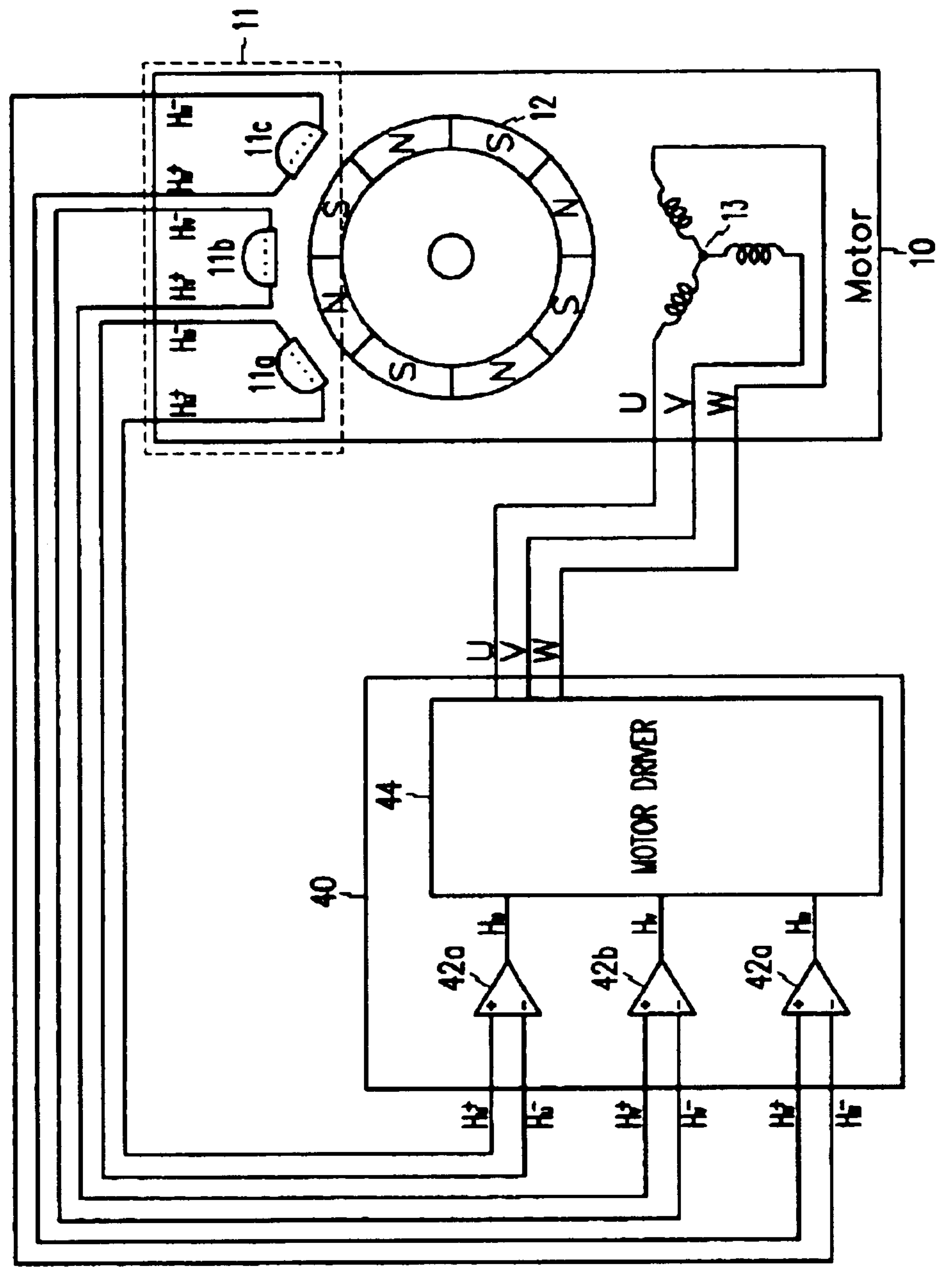
FIG. 1 shows a conventional three-phase BLDC motor and a motor driving circuit.
Figure 2:
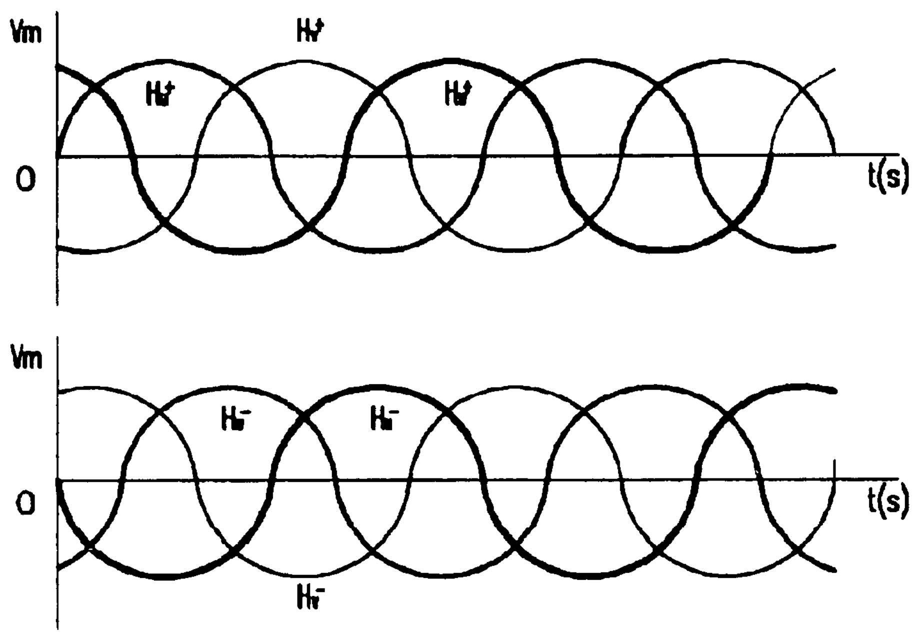
FIG. 2 shows waveforms of Hall signals of a conventional three-phase BLDC motor.

Comparing Hall signal Hw in FIG. 7 with Hall signal Hw in FIG. 2, the magnitude of Hall signal Hw in FIG. 7 is half of Hall signal Hw in FIG. 2, but the phases of the two signals are essentially the same. The magnitude of Hall signal Hw in FIG. 7 is halved, because equal-resistance resistors R11 and R12 are serially coupled and output node A is at the midpoint. In the control of BLDC motor 100, the relative phases of the Hall signals are more important than their amplitudes. Therefore, the output signals of adders 470*a* and 470*b* can have low levels as long as comparator 440*c* is capable of recognizing these levels.

Figure 8:
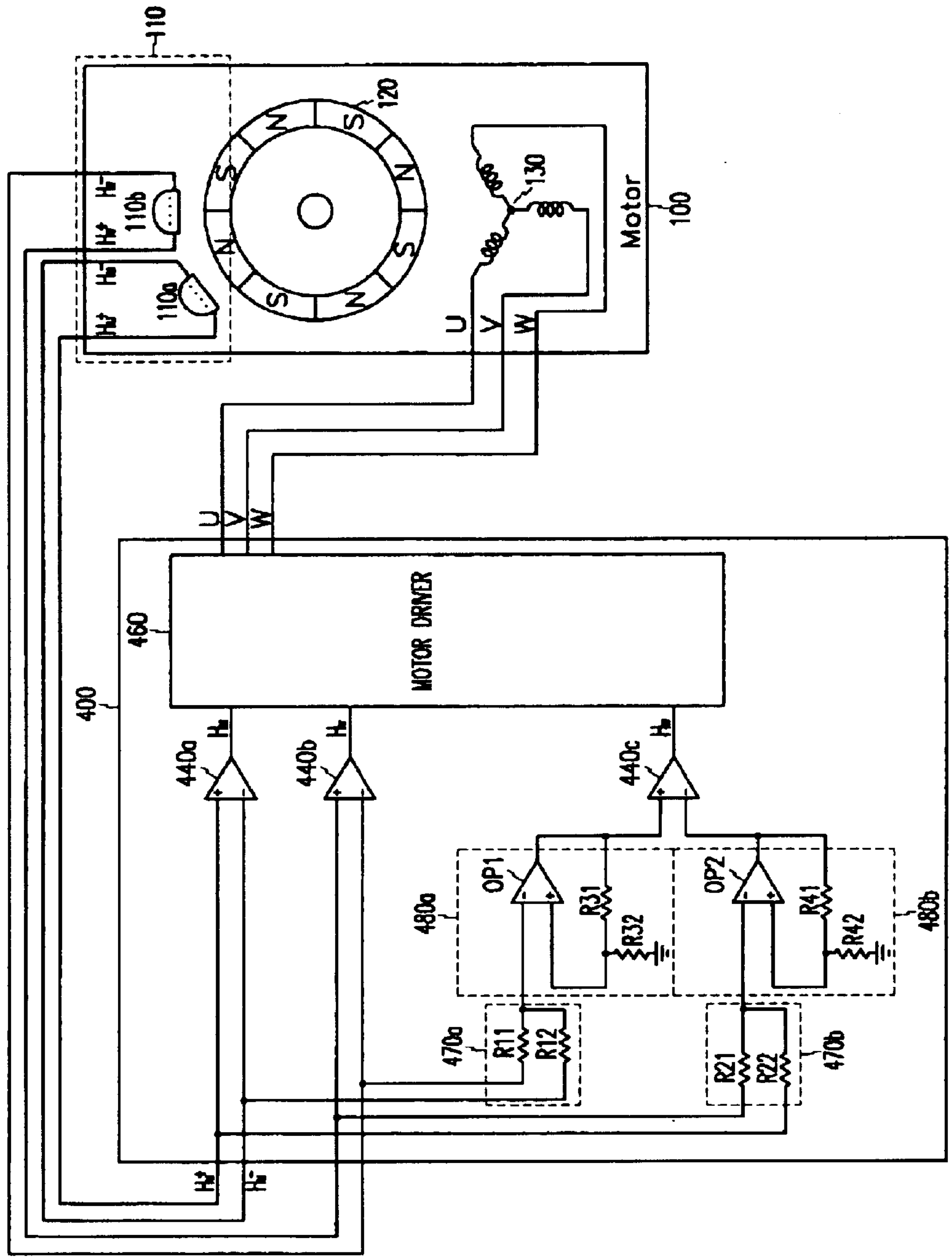
FIG. 8 shows a three-phase BLDC motor and a driving circuit according to an embodiment of the present invention.

FIG. 8 shows a BLDC motor 100 and a motor driving circuit 400 according to an embodiment of the present invention. Like reference numerals in FIGS. 5 and 8 denote like elements hence their description will be omitted.

In the embodiment of FIG. 8, motor driving circuit 400 includes first and second amplifiers 480*a* and 480*b* that respectively amplify the output signals of adders 470*a* and 470*b* of the driving circuit of FIG. 5 twofold.

Specifically, first amplifier 480*a* includes an operational amplifier OP1 having an inverting input terminal receiving the output signal of first adder 470*a*. The non-inverting input terminal of operational amplifier OP1 is coupled to the midpoint of serially coupled resistors R31 and R32. The output terminal of operational amplifier OP1 is coupled to one end of serially coupled resistors R31 and R32, whose other end is coupled to a ground. Here, resistors R31 and R32 have essentially the same resistance value R3. This layout produces a gain of 2 for first amplifier 480*a*.

Second amplifier 480*b* includes an operational amplifier OP2 having an inverting input terminal receiving the output signal of first adder 470*b*. The non-inverting input terminal of operational amplifier OP1 is coupled to the midpoint of serially coupled resistors R41 and R42. The output terminal of operational amplifier OP2 is coupled to one end of serially coupled resistors R41 and R42, whose other end is coupled to a ground. Here, resistors R41 and R42 have essentially the same resistance value R4. This layout produces a gain of 2 for second amplifier 480*b*.

First and second amplifiers 480*a* and 480*b* respectively amplify Hall signals output from adders 470*a* and 470*b* twofold. Therefore, this embodiment compensates the 50% loss of Hall signal amplitude at adders 470*a* and 470*b* by amplifying the Hall signals back to the level detected by Hall sensors 110*a* and 110*b*.

Figure 9:
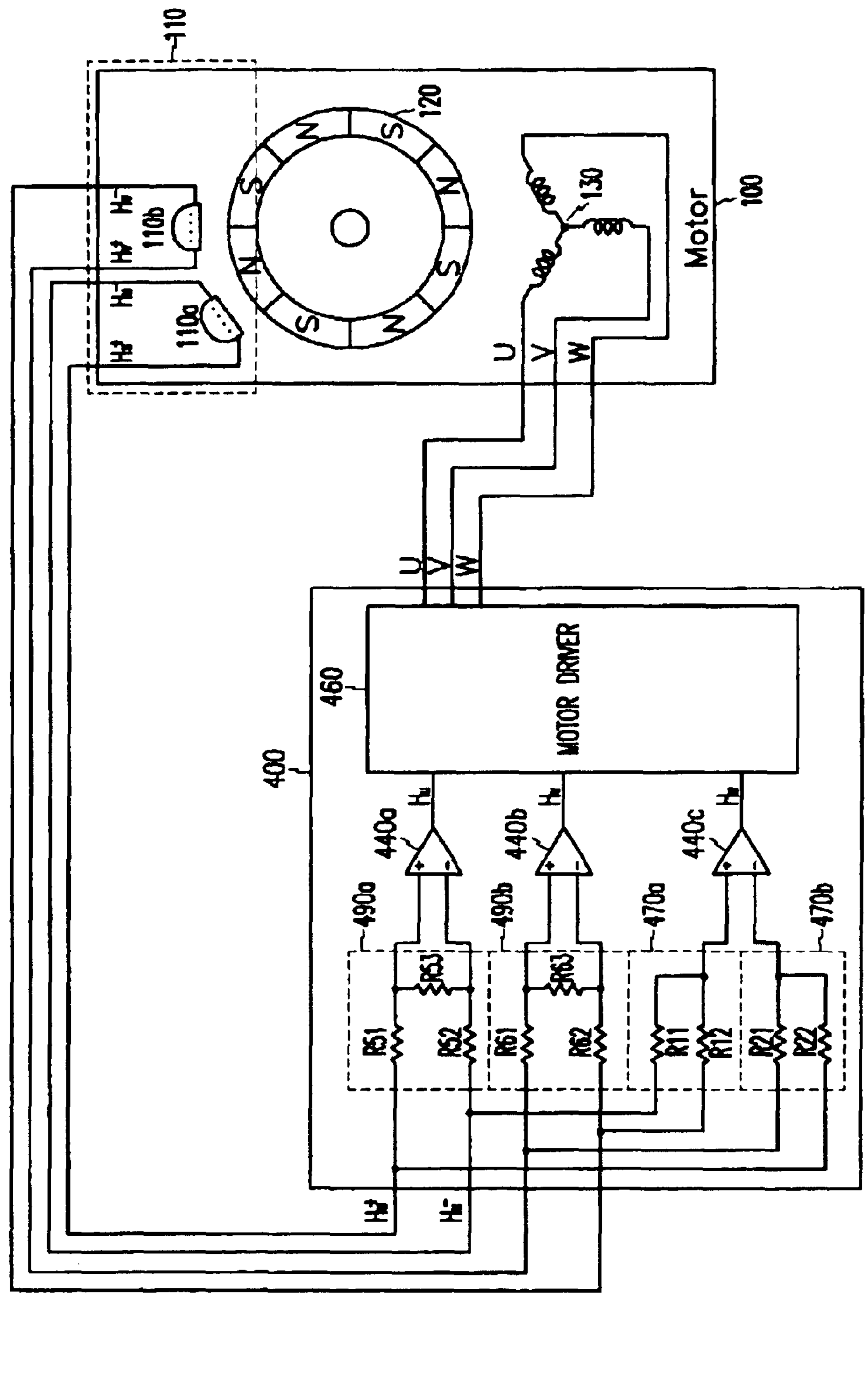
FIG. 9 shows a three-phase BLDC motor and a driving circuit according to an embodiment of the present invention.

FIG. 9 shows another embodiment of a BLDC motor 100 and a motor driving circuit 400. Like reference numerals in FIGS. 5 and 9 denote like elements hence their description will be omitted.

The embodiment of FIG. 8 amplified Hall signal Hw twofold to match the levels of Hall signals Hu and Hv. The embodiment of FIG. 9 instead reduces the amplitude of Hall signals Hu and Hv to match the level of Hall signal Hw. This is achieved by motor driving circuit 400 including third and fourth amplifiers 490*a* and 490*b* in addition to the elements of the embodiment in FIG. 5, coupled to the input terminals of comparators 440*a* and 440*b*, respectively.

Third amplifier 490*a* includes resistors R51 and R52, first terminals of which are respectively configured to receive Hall signals $Hu^{+}$ and $Hu^{-}$. The second terminals of resistors R51 and R52 are coupled to the non-inverting input terminal and to the inverting input terminal of the comparator 440*a*, respectively. A resistor R53 is coupled between the input terminals of comparator 440*a*. Resistors R51 and R52 have essentially the same resistance value R5. Comparator 440*a* can be, for example, an operational amplifier.

Fourth amplifier 490*b* includes resistors R61 and R62, first terminals of which are respectively configured to receive Hall signals $Hv^{+}$ and $Hv^{-}$. The second terminals of resistors R61 and R62 are coupled to the non-inverting input terminal and to the inverting input terminal of the comparator 440*b*, respectively. A resistor R63 is coupled between the input terminals of comparator 440*b*. Resistors R61 and R62 have essentially the same resistance value R6. Comparator 440*b* can be, for example, an operational amplifier.

The above-mentioned halving of the Hall signals Hu and Hv is achieved by choosing the values of resistors R51, R52, R53, R61, R62, and R63 to satisfy the following equations:

$$2\times R51=2\times R53=R52=2\times R5$$

$$2\times R61=2\times R63=R62=2\times R6 \quad (6)$$

The difference between voltages, received by the non-inverting terminal and the inverting terminal of first comparator 440*a* from third amplifier 490*a*, is $(Hu+-Hu^{-})/2$. The difference between voltages, received by the non-inverting terminal and the inverting terminal of second comparator 440*b* from fourth amplifier 490*b*, is (Hv+–Hv–)/2. The levels of these voltage differences are essentially identical to the level of the voltage difference, received by third comparator 440*c* from first and second adders 470*a* and 470*b*. Thus, the first, second, and third comparators 440*a*, 440*b*, and 440*c* receive essentially the same voltage difference.

In sum, the three Hall signals Hu, Hv, and Hw of the present embodiment have essentially the same magnitude and the same phase, while the magnitudes of the Hall signals output from the Hall sensors 110*a* and 110*b* are reduced by half.

The present invention has been described in connection with certain embodiments. However, it is to be understood that the invention is not limited to the disclosed embodiments, but, on the contrary, is intended to cover various modifications and equivalent arrangements included within the spirit and scope of the appended claims. For example, while the Hall detectors were described as Hall sensors in the embodiments of the present invention, other Hall detectors (a Hall IC, for instance) can be used as well.

As described above, embodiments of the invention use only two Hall sensors at the motor and include simple adders between the Hall sensors and the comparators of the motor driving circuit to generate a third Hall signal to drive the motor. Accordingly, the cost of the motor driving circuit can be reduced and the configuration of the motor system can be simplified.

What is claimed is:

1. A motor driving circuit for a three-phase brushless DC motor having a three-phase-coil and first and second Hall sensors, configured to detect the magnetic field of a rotor, the motor driving circuit comprising:

a first comparator, coupled to the first Hall sensor, configured to receive and compare a first pair of Hall signals generated by the first Hall sensor, and configured to output a first Hall signal;

a second comparator, coupled to the second Hall sensor, configured to receive and compare a second pair of Hall signals generated by the second Hall sensor, and configured to output a second Hall signal;

an adder unit, coupled to the first and second Hall sensors, configured to receive the first pair of Hall signals from the first Hall sensor and a second pair of Hall signals from the second Hall sensor, the adder unit further configured to output a third pair of Hall signals;

a third comparator, coupled to the adder unit, configured to compare the third pair of Hall signals of the adder unit and to output a third Hall signal; and a motor driver, coupled to the first, second and third comparators, configured to receive the first, second, and third Hall signals and to change directions of currents flowing through phases of the three-phase coil accordingly.

2. The motor driving circuit of claim 1, wherein the first pair of Hall signals includes first and second signals having a phase difference of 180°, and the second pair of Hall signals includes a third signal having a phase difference of 120° from the first signal and a fourth signal having a phase difference of 180° from the third signal.

3. The motor driving circuit of claim 2, wherein the third pair of Hall signals includes a fifth signal having a phase difference of 120° from the third signal and a sixth signal having a phase difference of 180° from the fifth signal.

4. The motor driving circuit of claim 3, wherein the adder unit comprises:

a first adder, configured to add the second signal of the first pair of Hall signals and the fourth signal of the second pair of Hall signals to generate the fifth signal of the third Hall signal pair; and a second adder, configured to add the first signal of the first pair of Hall signals and the third signal of the second pair of Hall signals to generate the sixth signal of the third Hall signal pair.

5. The motor driving circuit of claim 4, wherein:

the first adder comprises:

a first resistor, coupled to the first Hall sensor, configured to receive the second signal of the first pair of Hall signals at a first input terminal; and a second resistor, coupled to the second Hall sensor, configured to receive the fourth signal of the second pair of Hall signals at a second input terminal;

the first and second resistors coupled at their corresponding output terminals to form a first adder output terminal; and the second adder comprises:

a third resistor, coupled to the first Hall sensor, configured to receive the first signal of the first pair of Hall signals at a third input terminal; and a fourth resistor, coupled to the second Hall sensor, configured to receive the third signal of the second pair of Hall signals at a fourth input terminal;

the third and fourth resistors coupled at their corresponding output terminals to form a second adder output terminal.

6. The motor driving circuit of claim 5, wherein the first and second resistors have essentially the same resistance value, and the third and fourth resistors have essentially the same resistance value.

7. The motor driving circuit of claim 5, further comprising:

a first amplifier, coupled to the first adder, configured to amplify the output signal of the first adder; and a second amplifier, coupled to the second adder, configured to amplify the output signal of the second adder.

8. The motor driving circuit of claim 7, wherein:

the first amplifier comprises:

a first operational amplifier having a first terminal coupled to the first adder output terminal; and a fifth and a sixth resistor, coupled between an output port of the first operational amplifier and a ground, wherein a contact node of the fifth and sixth resistors is coupled to a second terminal of the first operational amplifier; and the second amplifier comprises:

a second operational amplifier having a first terminal coupled to the second adder output terminal; and a seventh and an eighth resistor coupled between an output port of the second operational amplifier and a ground, wherein a contact node of the seventh and eighth resistors is coupled to a second terminal of the second operational amplifier.

9. The motor driving circuit of claim 5, further comprising:

a third amplifier, coupled to the first Hall sensor, configured to reduce a magnitude of the first pair of Hall signals of the first Hall sensor by about a half; and a fourth amplifier, coupled to the second Hall sensor, configured to reduce a magnitude of the second pair of Hall signals of the second Hall sensor by about half.

10. The motor driving circuit of claim 9, wherein the third amplifier comprises:

a ninth resistor, coupled to the first Hall sensor, configured to receive the first signal of the first pair of Hall signals at a ninth input terminal, an output terminal of the ninth resistor coupled into a first input terminal of the first comparator;

a tenth resistor, coupled to the first Hall sensor, configured to receive the second signal of the first pair of Hall signals at a tenth input terminal, an output terminal of the tenth resistor coupled into a second input terminal of the first comparator; and a eleventh resistor, coupled between the first and the second terminal of the first comparator.

11. A method of driving a three-phase brushless DC motor having a three-phase-coil and first and second Hall sensors for detecting the magnetic field of a rotor, the method comprising:

(a) comparing a first pair of Hall signals, outputted by the first Hall sensor, to output a first Hall signal;

(b) comparing a second pair of Hall signals, outputted by the second Hall sensor, to output a second Hall signals;

(c) receiving the first pair of Hall signals and the second pair of Hall signals to generate a third pair of Hall signals;

(d) comparing the third pair of Hall signals to output a third Hall signal; and (e) changing directions of currents flowing through phases of the three-phase coil according to the first, second, and third Hall signals to rotate the rotor of the motor.

12. The motor-driving method of claim 11, wherein the first pair of Hall signals includes first and second signals having a phase difference of 180°;

the second pair of Hall signals includes a third signal having a phase difference of 120° from the first signal and a fourth signal having a phase difference of 180° from the third signal; and the third pair of Hall signals includes a fifth signal having a phase difference of 120° from the third signal and a sixth signal having a phase difference of 180° from the fifth signal.

13. The motor driving method of claim 12, wherein (c) includes:

adding the second signal of the first pair of Hall signals and the fourth signal of the second pair of Hall signals to generate the fifth signal of the third pair of Hall signals; and adding the first signal of the first pair of Hall signals and the third signal of the second pair of Hall signals to generate the sixth signal of the third pair of Hall signals.

14. The motor driving method of claim 13, further comprising:

amplifying the level of the third pair of Hall signals to approximately match the level of the first pair of Hall signals.

15. The motor driving method of claim 13, further comprising:

amplifying the level of at least one of the first and second pair of Hall signals to approximately match the level of the third pair of Hall signals.

16. A motor system comprising:

a three-phase brushless DC motor having a three-phase coil and first and second Hall sensors, configured to detect a magnetic field of a rotor; and a motor driving circuit, configured to control the rotation of the three-phase brushless DC motor, wherein the motor driving circuit comprises:

a first comparator, coupled to the first Hall sensor, configured to receive and compare a first pair of Hall signals generated by the first Hall sensor, and configured to output a first Hall signal;

a second comparator, coupled to the second Hall sensor, configured to receive and compare a second pair of Hall signals generated by the second Hall sensor, and configured to output a second Hall signal;

an adder unit, coupled to the first and second Hall sensors, configured to receive the first pair of Hall signals from the first Hall sensor and a second pair of Hall signals from the second Hall sensor, the adder unit further configured to output a third pair of Hall signals;

a third comparator, coupled to the adder unit, configured to compare the third pair of Hall signals of the adder unit and to output a third Hall signal; and a motor driver, coupled to the first, second and third comparators, configured to receive the first, second, and third Hall signals and to change directions of currents flowing through phases of the three-phase coil accordingly.

17. The motor system of claim 16, wherein:

the first pair of Hall signals includes first and second signals having a phase difference of 180°;

the second pair of Hall signals includes a third signal having a phase difference of 120° from the first signal and a fourth signal having a phase difference of 180° from the third signal; and the third pair of Hall signals includes a fifth signal having a phase difference of 120° from the third signal and a sixth signal having a phase difference of 180° from the fifth signal.

18. The motor system of claim 16, wherein the adder unit comprises:

a first adder, configured to add the second signal of the first pair of Hall signals and the fourth signal of the second pair of Hall signals to generate the fifth signal of the third Hall signal pair; and a second adder, configured to add the first signal of the first pair of Hall signals and the third signal of the second pair of Hall signals to generate the sixth signal of the third Hall signal pair.

* * * * *